United States Patent [19]

Emter

[11] Patent Number: 4,685,845
[45] Date of Patent: Aug. 11, 1987

[54] GUIDE PAD RESURFACING APPARATUS

[76] Inventor: James Emter, 23429 NE. 29th Ave., Ridgefield, Wash. 98642

[21] Appl. No.: 928,700

[22] Filed: Nov. 10, 1986

Related U.S. Application Data

[63] Continuation of Ser. No. 781,924, Sep. 30, 1985, abandoned.

[51] Int. Cl.⁴ .......................... B23C 9/00; B24B 7/00
[52] U.S. Cl. ..................................... 409/145; 51/114; 409/203; 409/213
[58] Field of Search ............... 409/138, 159, 147, 204, 409/203, 213, 217, 218, 145, 163; 51/80 R, 81 R, 111 R, 112, 114, 118, 131.3, 83 R; 144/116, 237, 134 A, 233

[56] References Cited

U.S. PATENT DOCUMENTS

| | | | |
|---|---|---|---|
| 1,418,490 | 6/1922 | Sproul | 409/203 |
| 1,434,824 | 11/1922 | Kershaw | 51/131.3 |
| 1,848,914 | 3/1932 | Trosch | 409/203 |
| 3,001,337 | 9/1961 | Dunn | 51/111 R |
| 3,260,019 | 7/1966 | Napp | 51/118 |
| 3,469,351 | 9/1969 | Thielenhaus | 51/118 |
| 3,503,155 | 3/1970 | Dunn | 51/114 |
| 3,774,348 | 11/1973 | Dunn | 51/111 R |
| 3,818,640 | 6/1974 | Dunn | 51/114 |

Primary Examiner—William R. Briggs
Attorney, Agent, or Firm—Chernoff, Vilhauer, McClung & Stenzel

[57] ABSTRACT

A babbit guide plug resurfacing apparatus includes a motorized clamp assembly for holding a circular saw guide in a fixed position so that guide plugs on both sides thereof are exposed, and for moving the saw guide into engagement with an abrading assembly. The abrading assembly comprises upper and lower turntables coupled by a belt to a motor. The turntables, which include cutter heads on their inside surfaces, are separated by a spacer so as to allow the guide plugs to pass between the plates for simultaneous resurfacing which insures uniformity of the smoothness of the surface of each plug.

10 Claims, 7 Drawing Figures

GUIDE PAD RESURFACING APPARATUS

This application is a continuation, of application Ser. No. 781,924, filed 9-30-85 now abandoned.

BACKGROUND OF THE INVENTION

The following invention relates to a resurfacing machine for resurfacing babbit guide plugs disposed on either side of a saw guide.

Circular saws are sometimes included in saw arrays for performing such tasks as edging and cutting logs into boards of various thicknesses. Such circular saw arrays are designed to cut boards with a very narrow kerf so as to maximize the yield from a log or cant which may be fed into the array. In order to keep the kerf very small, saw guides are necessary to insure that the circular saws in the saw array do not wobble and maintain their alignment so that all cuts are parallel. These types of saw guides include what are known in the industry as babbit guide plugs which are disc-shaped replacable pads which are mounted on either side of the saw guide. The babbit guide plugs are wear parts, that is, portions of the circular saw blades make contact with the plugs as the plugs maintain the planar orientation of the circular saws. It is necessary to remachine or resurface the guide plugs an average of once every 16 hours that the saw array is in use.

The accuracy of the cut of the circular saw array can be maintained only if the babbit guide plugs of the saw guides have parallel surfaces. Unevenly worn guide plug surfaces or surfaces on either side of the saw guide which are out of parallelism may cause the circular saw array to cut with a wider kerf or cut uneven or nonparallel boards. It is therefore necessary, in such a resurfacing process, to maintain parallelism on both sides of the saw guide, that is, the babbit guide plugs when resurfaced should have surfaces that are parallel to each other.

In the past, resurfacing machines have been available which performed the task of resurfacing the guide plugs. An example of such a machine is a resurfacer available from Industrial Machine Co. of Battleground, Washington. This resurfacer includes a single turntable which has a cutting stylus which rotates at a high speed. The saw guides are placed on a movable magnetic base and manually moved into engagement with the turntable. As the babbit guide plug moves across the surface of the turntable the cutting stylus abrades the plug by cutting a continuous series of arcs thereby creating a smooth surface. The saw guide is then turned over onto its other side and the opposite side plug is moved across the turntable.

One problem with the aforementioned device is that since both sides of the guide plug are machined separately, there is no assurance that the two sides will be parallel. Small differences in the manner of manually moving the plugs into engagement with the turntable or of placing the saw guide on the magnetic base can lead to a non-uniform resurfacing the plugs. With manual operation there is always the possibility that the two sides of the saw guide could have at least portions of their surfaces cut differently thereby causing the two surfaces to be nonuniform or nonparallel. Resurfacing one side at a time also takes twice as long.

Yet an additional problem is that the motorized turntable of the aforementioned device is directly connected to its driving motor. Thus, vibration from the motor is transmitted to the spinning turntable which further degrades the precision of the abrading process.

What is needed, therefore, is a saw guide resurfacing apparatus capable of precise remachining of the surfaces of the guide plugs so that those surfaces are uniformly smooth and parallel to each other.

SUMMARY OF THE INVENTION

The present invention provides a saw guide resurfacing apparatus capable of insuring accurate remachining of babbit plugs thereby maintaining parallelism between their oppositely disposed surfaces. The invention includes a frame and a saw guide positioning device for holding the saw guide in a predetermined orientation with respect to the frame. The saw guide is held in the positioning device by a clamp assembly which is mounted on a track. The clamp is connected by a tie rod to a chain and sprocket assembly which is motor driven so that the clamp is moved along a linear path. The clamp holds the saw guide so that the babbit plugs are exposed on either side and may thus move between a stacked pair of abrading plates which are turntables supported above the frame on bearings and separated by a spacer. Each of the turntables includes a cutter head which may be selectively removed. The turntable plates rotate on a spindle which is belt-driven by a motor connected to the frame. The belt, which is elastic, filters vibration from the motor so that it is not transmitted to the turntable plates. The motor mounting includes a tensioning spring interacting between the motor and the frame to keep proper tension on the belt. The tension is loose enough to permit the spindle to slip in the belt until the turntable achieves proper rotational speed. Thus, the spring and belt act like a slip clutch so that the motor is not unduly loaded upon startup.

The cutter heads are screw-mounted inserts which mount into recesses in the turntables. A pressure screw is located in the forward (radially outermost) end of the turntable to adjust the cutting depth of a diamond stylus held within the head. A gauge having a depth-sensing plunger may be mounted adjacent the adjustment screw to provide an indication of cutter depth.

Accuracy in machining the babbit plugs is provided by the simultaneous resurfacing of opposite sides of the saw guide as the plugs pass between the rotating plates holding the cutting heads. Since the plates are maintained strictly parallel by a large precision-machined spacer, the resurfaced babbit plugs will have parallel surfaces. Since the saw guides are not manually moved between the twin cutting heads but are motordriven along a linear track with a clamp holding the saw guide in a rigid plane with respect to the cutting heads, each side is cut at exactly the same speed and to a predetermined depth with uniform smoothness.

It is a primary object of this invention to provide a babbit plug resurfacing apparatus for insuring the parallelism of oppositely disposed babbit plugs which are resurfaced simultaneously.

Yet a further object of this invention is to provide a babbit plug resurfacing machine having an automatic motive means for moving the plugs into engagement with an abrading device.

A still further object of this invention is to provide a means of adjusting the cutting depth of a selectively removable cutter head in a babbit guide plug resurfacing apparatus.

A still further object of this invention is to provide an abrading machine for resurfacing babbit plugs in which a motor driving rotating cutter heads is decoupled from the heads so that vibration is not transmitted thereto.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
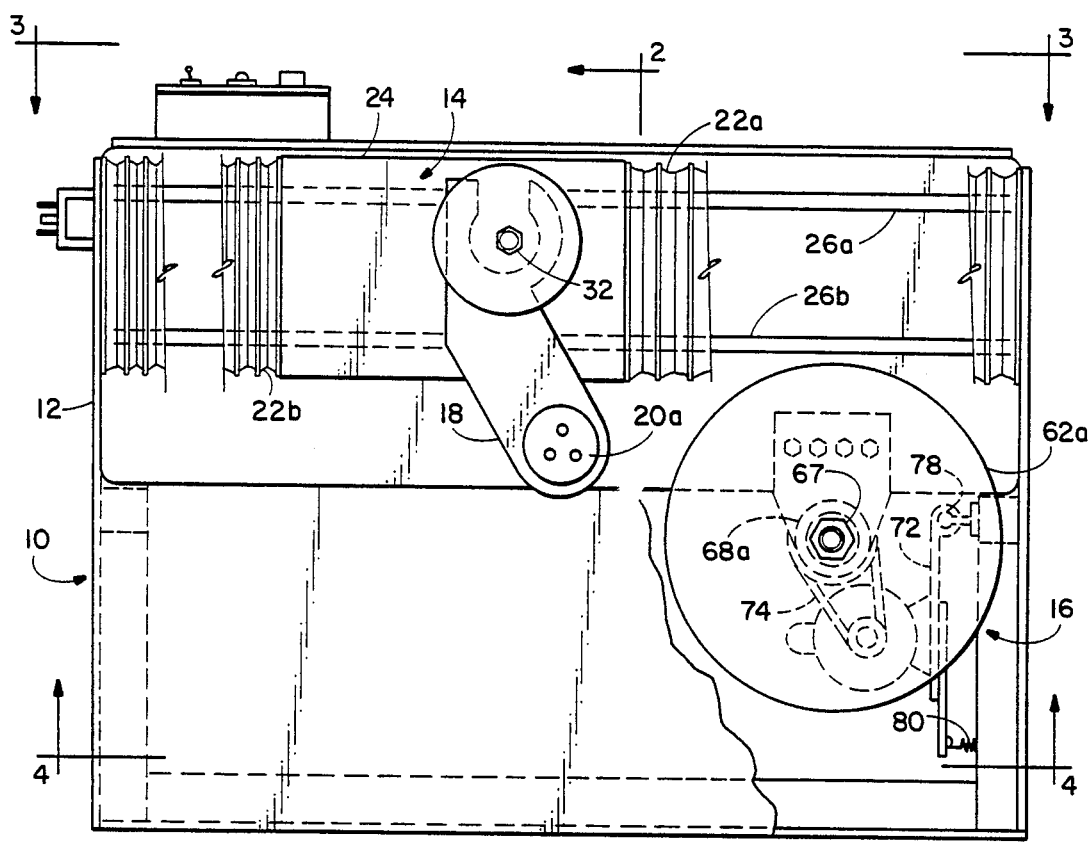
FIG. 1 is a top view of an apparatus for resurfacing babbit guide plugs.
Figure 2:
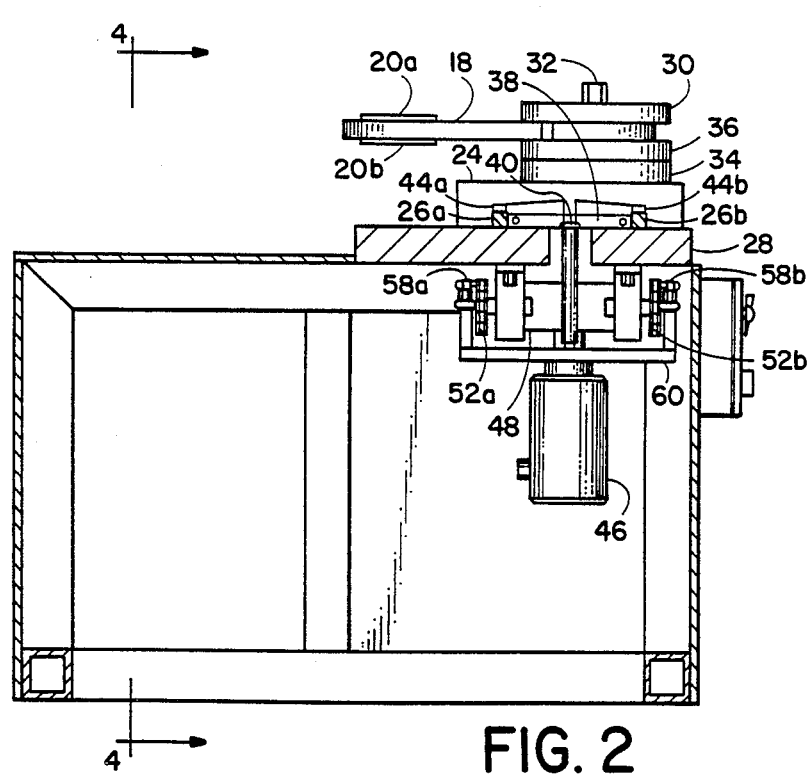
FIG. 2 is a side cutaway view taken along line 2—2 of FIG. 1.
Figure 3:
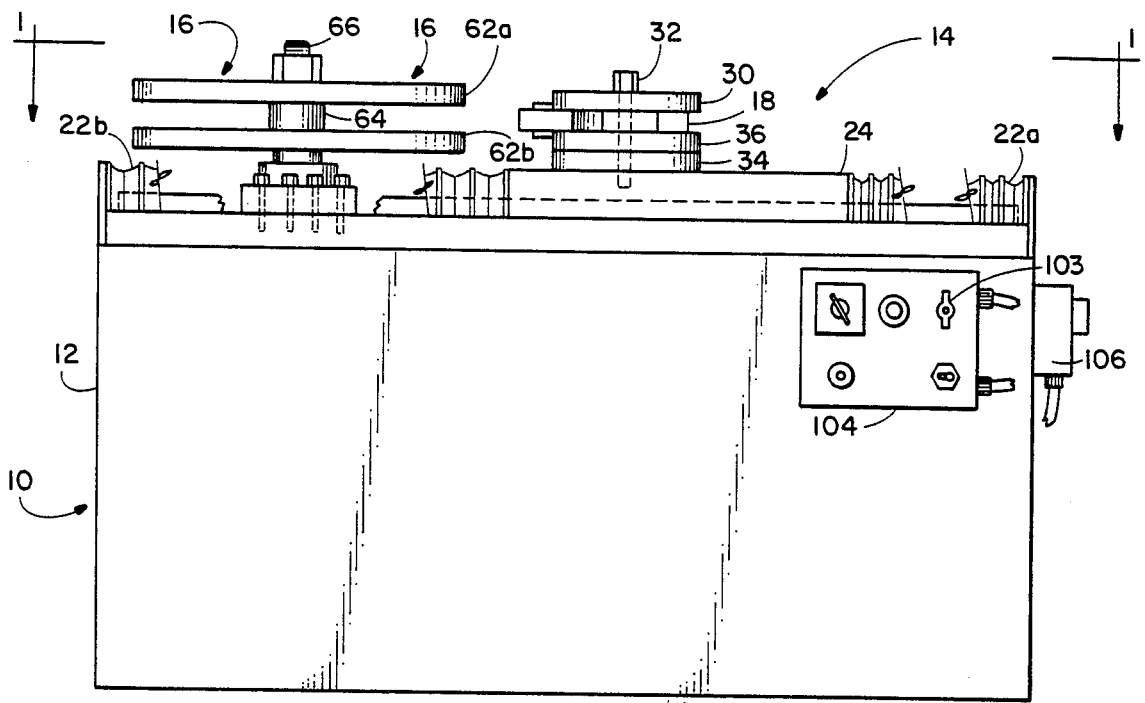
FIG. 3 is a side view of the machine of FIG. 1 taken along line 3—3.
Figure 4:
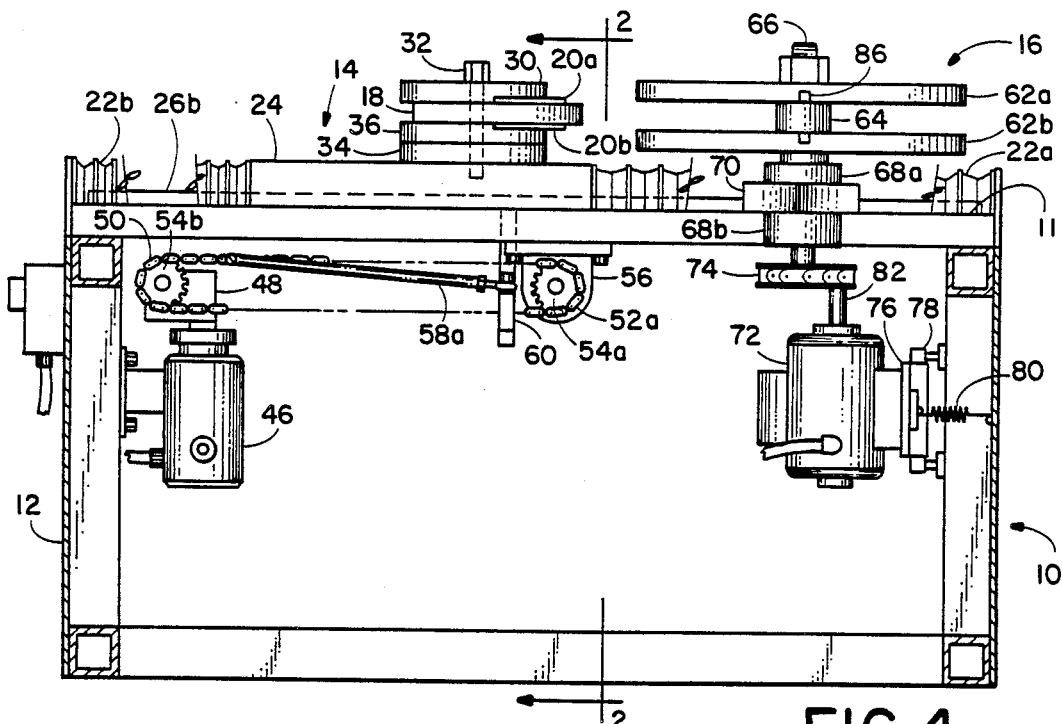
FIG. 4 is a side cutaway view of the machine of FIG. 1 along line 4—4.

A resurfacing machine 10 includes a frame 12 on which is mounted a motorized clamp assembly indicated generally at 14 and an abrading assembly indicated generally at 16. A saw guide 18 includes a pair of babbit guide plugs 20a and 20b disposed on opposite sides thereof. The motorized clamp assembly 14 includes a bellows-type dust cover which includes portions 22a and 22b. The clamp assembly 14 is mounted on a base plate 24 which is grooved underneath to allow the base plate 24 to ride along a pair of tracks 26a and 26b. The tracks 26a and 26b are fixedly mounted to a raised portion 28 of the frame 12.

The clamp assembly 14 includes a top plate 30 which is held in place by a bolt and nut 32 and a lower clamping plate 34. Height may be regulated by any number of spacer plates 36 which may be inserted between the upper and lower plates 30 and 34, respectively. In order to keep side-to-side motion of the base plate 24 at a minimum, a plastic spacer 38 is affixed at both ends of the base plate 24 between the tracks 26a and 26b. The plastic spacer 38 includes a recess 40 which houses a retaining spring 42. The retaining spring 42 holds a pair of felt pads 44a and 44b in place between the base plate 24 and the top of the tracks 26a and 26b.

The clamp assembly 14 is driven along tracks 26a and 26b by a motor 46 which is coupled through a bevel gear assembly 48 to a pair of chain and sprocket assemblies generally indicated at 50. The chain and sprocket assemblies 50 include chains 52a and 52b. Chain 52a is looped about sprockets 54a and 54b and the sprockets 54a and 54b are rigidly coupled to the frame 12 by way of the bevel gear assembly 48 for sprocket 54b, and by a sprocket support plate 56 for sprocket 54a. Chain 54b is mounted to an opposite pair of sprockets (not shown in detail) in the same manner.

The clamp assembly 14 is connected to the chain and sprocket assembly 50 by a pair of tie bars 58a and 58b which are coupled to a T-shaped carriage bar 60 that extends downwardly from base plate 24. The other ends of tie rods 58a and 58b are connected to respective links on chains 52a and 52b.

The abrading assembly 16 comprises upper and lower turntable plates 62a and 62b, respectively, separated by a spacer 64. The plates and spacer are mounted on a spindle 66 which extends through the frame 12 so that the lower portion of the spindle 66 projects below the flat load-bearing surface 11 of the frame 12. A nut 67 holds the plates on the spindle 66. If desired, the top turntable plate 62a may be removed and the plugs 20a and 20b may be machined one side at a time. The entire weight of the turntables 62a and 62b is supported by bearings 68a and 68b. The bearings 68a and 68b are coupled to a base plate 70 which is fastened to the surface 11.

The spindle 66 is driven by a motor 72 which is coupled to it by way of a belt 74. The motor 72 is connected to the frame 12 by means of a plate 76 which is hinge-mounted to the frame 12 by a hinge 78 on one end and a spring 80 on the other end. The hinge and spring arrangement maintains proper pressure on the belt 74 such that some slippage is allowed on start-up of the motor 72. As the turntables 62a and 62b achieve proper speed the belt 74 fully engages the torque shaft 82 of the motor 72. Thus the hinge 78 and spring 80 coupling the motor 72 to the frame 12 acts as a slip clutch.

Figure 5:
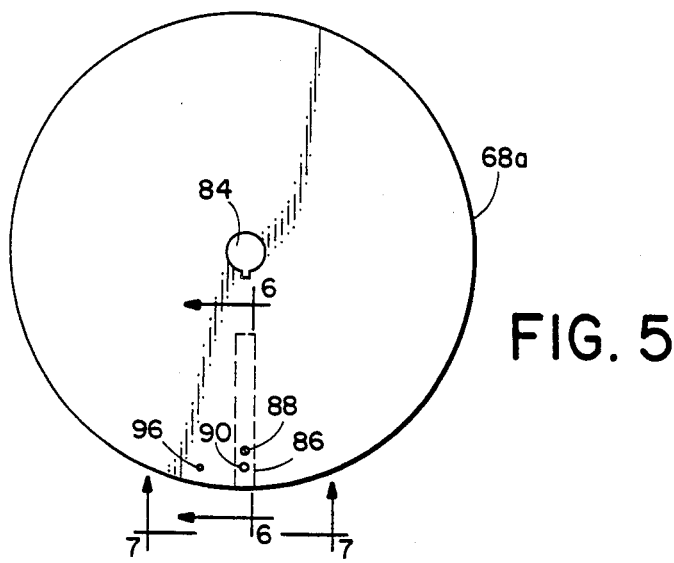
FIG. 5 is a top view of one of the turntables shown in FIG. 1.
Figure 6:
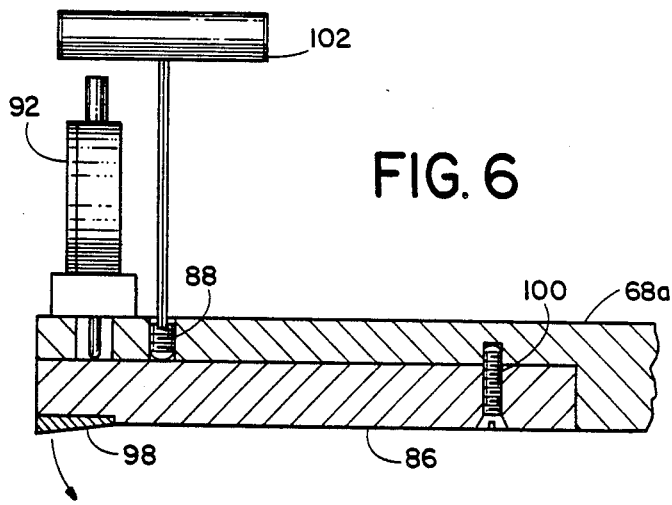
FIG. 6 is a partial cutaway side view taken along line 6—6 of FIG. 5 and including an adjusting tool and an adjusting gauge connected thereto.
Figure 7:
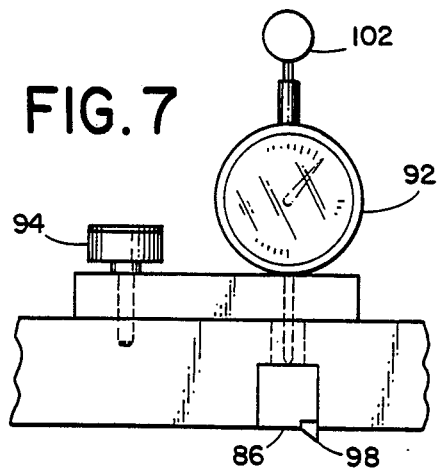
FIG. 7 is a partial front view of the turntable of FIG. 6.

Referring now to FIGS. 5, 6 and 7, a turntable plate such as plate 62a includes a keyhole-shaped groove 84 for mounting on spindle 66 which has a correspondingly mating tongue 73. The underside of turntable 62a includes a hollow portion for housing a cutter head 86 (shown in phantom lines in FIG. 5). An adjusting screw 88 is provided for adjusting the depth of cutter head 86. An aperture 90 is provided for the insertion of a cutter head depth gauge 92, which may be temporarily affixed to the top of the turntable plate 62a by a bolt 94 which screws into a threaded aperture 96. The cutter head 86 is a generally rectangular steel bar which includes a diamond stylus head 98 and is held in place by a screw 100. The penetrating depth of the cutter head 86 and hence stylus 98 is controlled by adjusting screw 88 with a tool 102.

Both motors 46 and 72 are controlled from independent switch boxes on the side of the frame 12. Motor 46 is a variable speed DC motor controlled from switch box 104 and motor 72 is a fixed speed DC motor controlled from switch box 106. Both switch boxes include appropriate pilot lights and box 104 includes a variable speed control 103.

In actual operation a saw guide 18 is clamped onto clamp assembly 14 and the motor 72 is turned on. After the turntable plates 62a and 62b achieve proper speed, motor 46 may be turned on which will slowly move the guide pads 20a and 20b into engagement with the abrading assembly 16. As shown best in FIG. 1 the pads 20a and 20b may move between the plates 62a and 62b such that the cutting heads on both plates resurface the pads 20a and 20b simultaneously by cutting an almost continuous series of arcs across their respective surfaces. The plates 62a and 62b together with spacer 64 are precision machined so that they are parallel when placed in the stack on spindle 66. This insures that the resurfacing of pads 20a and 20b results in surfaces that are uniformly smooth and parallel. Because both surfaces 20a and 20b move between the turntable plates 62a and 62b in unison, that is, at the same rate of speed, and at the same orientation with respect thereto, there will be no differences in their respective surface configurations after the abrading process.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for resurfacing a pair of plugs disposed on opposite sides of a saw guide comprising:
   (a) a frame;
   (b) saw guide positioning means for holding the saw guide in a predetermined orientation relative to said frame; and
   (c) upper and lower turntable plates horizontally disposed with respect to said frame and coaxially mounted on a single spindle for effecting resurfacing on opposite sides of said saw guide simultaneously
   (d) motor means having an output shaft, said motor means being resiliently coupled to said frame; and
   (e) belt drive means for coupling said output shaft to said single spindle
   (f) a cutting head situated along an outer rim of each of said turntable plates and carrying a cutting stylus, at least one of said cutting heads having adjustment means for regulating the cutting depth of the stylus mounted on said cutting head.

2. The apparatus of claim 1 wherein said saw guide positioning means includes motivation means for automatically moving said plugs into engagement with said abrading means.

3. The apparatus of claim 2 wherein said saw guide positioning means includes clamping means for frictionally gripping a portion of said saw guide whereby both fo said plugs are simultaneously exposed to said stylus means.

4. The apparatus of claim 3 wherein said clamping means is driven along a linear track by said motivation means.

5. The apparatus of claim 4 wherein said motivation means comprises a motor and a pair of chain and sprocket assemblies, and further includes a pair of tie rods, each tie rod respectively connected between a link of each respective chain and a downwardly extending carriage bar attached to said clamping means.

6. The apparatus of claim 1 wherein said motor means is resiliently coupled to said frame by a hinge and spring means, said spring means resiliently urging said output shaft of said motor means against said belt drive means to maintain sufficient tension on said belt drive means to provide for the transmission of torque from said output shaft to said single spindle, while simultaneously permitting said output shaft to slip within said belt drive means on initial start up of said motor means.

7. The apparatus of claim 1 wherein the weight of said spindle and of said turntable plates is supported by at least one bearing attached to said frame.

8. The apparatus of claim 1 wherein each of said first and second head means includes a selectively replacable cutting head including a stylus and further including adjusting means for selectively adjusting the cutting depth of said stylus.

9. The apparatus of claim 8 further including gauge means for monitoring the cutting depth of said stylus.

10. Apparatus for resurfacing a pair of plugs disposed on opposite sides of a saw guide, comprising:
    (a) a frame;
    (b) saw guide positioning means for holding the saw guide in a predetermined orientation relative to said frame; and
    (c) upper and lower turntable plates horizontally disposed with respect to said frame and coaxially mounted on a single spingle;
    (d) drive means on said frame for rotating said spindle;
    (e) selectively removable spacer means separating said upper and lower turntable plates; and
    (f) a cutting head situated along an outer rim of each of said turntable plates and carrying a cutting stylus, at least one of said cutting heads having adjustment means for regulating the cutting depth of the stylus mounted on said cutting head whereby said removable spacer means comprises adjustment means and said cutting head adjustment means comprises fine adjustment means for the distance between said turntable plates.

* * * * *